United States Patent
Zhang et al.

(10) Patent No.: US 12,037,506 B2
(45) Date of Patent: Jul. 16, 2024

(54) MOISTURE-CURABLE POLYOLEFIN FORMULATION

(71) Applicant: Union Carbide Corporation, Seadrift, TX (US)

(72) Inventors: Yichi Zhang, Novi, MI (US); Jeffrey M. Cogen, Flemington, NJ (US); Matthew R. Pickett, Collegeville, PA (US)

(73) Assignee: Union Carbide Corporation, Seadrift, TX (US)

( * ) Notice: Subject to any disclaimer, the term of this patent is extended or adjusted under 35 U.S.C. 154(b) by 814 days.

(21) Appl. No.: 17/050,273

(22) PCT Filed: May 8, 2019

(86) PCT No.: PCT/US2019/031237
§ 371 (c)(1),
(2) Date: Oct. 23, 2020

(87) PCT Pub. No.: WO2019/226346
PCT Pub. Date: Nov. 28, 2019

(65) Prior Publication Data
US 2021/0087422 A1   Mar. 25, 2021

Related U.S. Application Data

(60) Provisional application No. 62/676,298, filed on May 25, 2018.

(51) Int. Cl.
| | | |
|---|---|---|
| *C09D 123/08* | (2006.01) |
| *C08F 210/02* | (2006.01) |
| *C08K 5/1515* | (2006.01) |
| *C08K 5/1535* | (2006.01) |
| *C09D 7/63* | (2018.01) |
| *H01B 3/44* | (2006.01) |

(52) U.S. Cl.
CPC ...... *C09D 123/0892* (2013.01); *C08F 210/02* (2013.01); *C08K 5/1515* (2013.01); *C08K 5/1535* (2013.01); *C09D 7/63* (2018.01); *H01B 3/441* (2013.01)

(58) Field of Classification Search
CPC ............ C09D 123/0846; C09D 151/00; C09D 151/003; C09D 151/06; C09J 123/0846; C09J 151/00; C09J 151/003; C09J 151/06; C08L 23/0846; C08L 51/00; C08L 51/003; C08L 51/06; C08K 5/10; C08K 5/1535
See application file for complete search history.

(56) References Cited

U.S. PATENT DOCUMENTS

| | | |
|---|---|---|
| 5,686,546 A | 11/1997 | Henderson |
| 6,162,419 A | 12/2000 | Perricone et al. |
| 6,404,971 B2 | 6/2002 | Mehl |
| 6,936,655 B2 | 8/2005 | Borke et al. |
| 6,936,671 B2 | 8/2005 | Mehta et al. |
| 9,790,307 B2 | 10/2017 | Alam et al. |
| 2003/0109494 A1 | 6/2003 | Hebert |
| 2008/0176981 A1 | 7/2008 | Biscoglio et al. |
| 2008/0287533 A1 | 11/2008 | Gupta |
| 2010/0056809 A1 | 3/2010 | Tsai et al. |
| 2011/0282024 A1 | 11/2011 | Weissenbach et al. |
| 2015/0166708 A1 | 6/2015 | Alam et al. |
| 2016/0200843 A1 | 7/2016 | Ioannidis et al. |

FOREIGN PATENT DOCUMENTS

| | | | |
|---|---|---|---|
| CA | 2161991 | 5/1996 | |
| CN | 107057179 A * | 8/2017 | ............ C08K 5/005 |
| EP | 2889323 | 7/2015 | |
| WO | 2000071094 | 11/2000 | |
| WO | 2005110123 | 11/2005 | |
| WO | WO-2007008765 A2 * | 1/2007 | ............ C08F 255/02 |
| WO | 2015149634 | 10/2015 | |
| WO | 2018063866 | 4/2018 | |

OTHER PUBLICATIONS

PCT/US2019/031237, International Search Report and Written Opinion with a mailing date of Aug. 9, 2019.

* cited by examiner

*Primary Examiner* — John M Cooney
*Assistant Examiner* — Jeffrey S Lenihan

(57) ABSTRACT

A moisture-curable formulation comprising a (hydrolyzable silyl group)-functional polyolefin prepolymer and an ascorbyl carboxylate ester. Methods of making and using same, a cured polyolefin made therefrom, and articles containing or made from same.

9 Claims, No Drawings

MOISTURE-CURABLE POLYOLEFIN FORMULATION

FIELD

A moisture-curable formulation comprising a moisture-curable polyolefin and an ascorbic carboxylic ester, methods of making and using same, a cured polyolefin made from same, and articles containing or made from same.

INTRODUCTION

Patent application publications in or about the field include CA 2161991A1; CN105754185A; CN 105949547A; EP 2 889 323 A1; US 2003/0109494 A1; US 2008/0176981 A1; US 2010/0056809 A1; US 2011/0282024 A1; US 2015/0166708 A1; US 2016/0200843 A1; WO 2000/071094 A1 and WO 2005/110123 A1. Patents in the field include U.S. Pat. Nos. 5,686,546; 6,162,419; 6,936,655 B2; and U.S. Pat. No. 9,790,307 B2.

SUMMARY

We have discovered that ascorbyl carboxylate esters are useful as metal-free, environmentally safe, non-toxic catalysts that enhance curing of moisture-curable polyolefins. Our technical solution comprises a moisture-curable formulation comprising a (hydrolyzable silyl group)-functional polyolefin prepolymer and an ascorbyl carboxylate ester. The technical solution also includes methods of making and using same, a cured polyolefin made therefrom, and articles containing or made from same.

DETAILED DESCRIPTION

The Summary and Abstract are incorporated here by reference. Examples of embodiments include the following numbered aspects.

Aspect 1. A moisture-curable formulation comprising (A) a (hydrolyzable silyl group)-functional polyolefin prepolymer and (B) an ascorbyl carboxylate ester of formula (I):

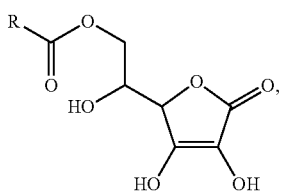

(I)

wherein R is an unsubstituted $(C_1-C_{45})$hydrocarbyl group; wherein (A) is from 89.0 to 99.9 weight percent (wt %) and (B) is from 11.0 to 0.1 wt % of the combined weight of (A) and (B); and wherein (A) is from 40 to 99.9 wt %, of total weight of the moisture-curable formulation and (B) is from 0.1 to 11 wt % of the total weight of the moisture-curable formulation. The "unsubstituted" means R consists of carbon and hydrogen atoms. R may be a $(C_1-C_{45})$alkyl group, a $(C_2-C_{45})$alkenyl group, a $(C_6-C_{12})$aryl group, a $(C_1-C_{25})$alkyl-substituted $(C_6-C_{12})$aryl group, or a $(C_6-C_{12})$aryl-substituted $(C_1-C_{25})$alkyl group.

Aspect 2. The moisture-curable formulation of aspect 1 wherein the (A) (hydrolyzable silyl group)-functional polyolefin prepolymer is characterized by any one of limitations (i) to (iii): (i) each hydrolyzable silyl group is independently a monovalent group of formula (II): $(R^2)_m(R^3)_{3-m}Si—$ (II); wherein subscript m is an integer of 1, 2, or 3; each $R^2$ is independently H, HO—, $(C_1-C_6)$alkoxy, $(C_2-C_6)$carboxy, $((C_1-C_6)alkyl)_2N—$, $(C_1-C_6)alkyl(H)C=NO—$, or $((C_1-C_6)alkyl)_2C=NO—$; and each $R^3$ is independently $(C_1-C_6)$alkyl or phenyl; (ii) the polyolefin portion of (A) is polyethylene based, poly(ethylene-co-$(C_3-C_{40})$alpha-olefin)-based, or a combination thereof; and (iii) both (i) and (ii).

Aspect 3. The moisture-curable formulation of aspect 1 or 2 wherein the (B) ascorbyl carboxylate ester of formula (I) is characterized by any one of limitations (i) to (xviii): (i) R is a $(C_1-C_{45})$alkyl group; (ii) R is a branched chain $(C_1-C_{45})$alkyl group; (iii) R is a straight chain $(C_1-C_{45})$alkyl group; (iv) R is a straight chain $(C_1-C_{45})$alkyl group that is unsubstituted; (v) R is a $(C_1-C_{35})$alkyl group; (vi) R is a $(C_1-C_{25})$alkyl group; (vii) R is a $(C_9-C_{25})$alkyl group; (viii) R is a $(C_{11}-C_{19})$alkyl group; (ix) R is a $(C_{12}-C_{18})$alkyl group; (x) R is a $(C_{13}-C_{17})$alkyl group; (xi) R is a $(C_{14}-C_{16})$alkyl group; (xii) R is a straight chain $(C_{14}-C_{16})$alkyl group; (xiii) R is a $(C_{14})$alkyl group; (xiv) R is a straight chain $(C_{14})$alkyl group; (xv) R is a $(C_{15})$alkyl group; (xvi) R is a straight chain $(C_{15})$alkyl group; (xvii) R is a $(C_{16})$alkyl group; and (xviii) R is a straight chain $(C_{16})$alkyl group.

Aspect 4. The moisture-curable formulation of aspect 1 or 2 wherein the (B) ascorbyl carboxylate ester of formula (I) is characterized by any one of limitations (i) to (v): (i) R is a $(C_2-C_{45})$alkenyl group, a $(C_6-C_{12})$aryl group, a $(C_1-C_{25})$alkyl-substituted $(C_6-C_{12})$aryl group, or a $(C_6-C_{12})$aryl-substituted $(C_1-C_{25})$alkyl group; (ii) R is a $(C_2-C_{45})$alkenyl group; (iii) R is a $(C_6-C_{12})$aryl group; (iv) R is a $(C_1-C_{25})$alkyl-substituted $(C_6-C_{12})$aryl group; and (v) R is a $(C_6-C_{12})$aryl-substituted $(C_1-C_{25})$alkyl group.

Aspect 5. The moisture-curable formulation of any one of aspects 1 to 4 further comprising (C) a peroxide and/or $(B^{Ox})$ a reaction product of oxidation of the (B) ascorbyl carboxylate ester by the (C) peroxide; wherein the (C) peroxide is (C1) a hydrocarbyl hydroperoxide or (C2) an organic peroxide. In some aspects the (C) peroxide is (C1), and the (C1) is cumyl hydroperoxide.

Aspect 6. The moisture-curable formulation of any one of aspects 1 to 5 further comprising at least one additive selected from additives (D) to (I): (D) a flame retardant; (E) an antioxidant; (F) a metal deactivator (e.g., oxalyl bis (benzylidene)hydrazide (OABH)); (G) a colorant; (H) a moisture scavenger; and (I) a combination of any two or more of (D) to (H).

Aspect 7. A method of making a moisture-curable formulation, the method comprising mixing (A) a (hydrolyzable silyl group)-functional polyolefin prepolymer and (B) an ascorbyl carboxylate ester of formula (I):

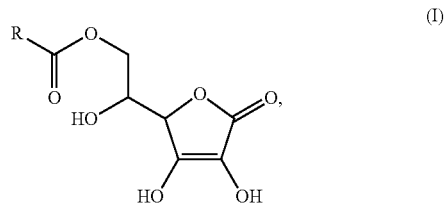

(I)

wherein R is a $(C_1-C_{45})$alkyl group; so as to give a mixture; and melting or extruding the mixture so as to make the moisture-curable formulation. The moisture-curable formulation made by the method may be that of any one of aspects 1 to 6.

Aspect 8. A moisture-cured polyolefin product that is a product of moisture curing the moisture-curable formulation of any one of aspects 1-6, or the moisture-curable formulation made by the method of aspect 7, to give the moisture-cured polyolefin product.

Aspect 9. A manufactured article comprising a shaped form of the moisture-cured polyolefin product of aspect 8.

Aspect 10. A coated conductor comprising a conductive core and a polymeric layer at least partially surrounding the conductive core, wherein at least a portion of the polymeric layer comprises the moisture-cured polyolefin product of aspect 8.

Aspect 11. A method of conducting electricity, the method comprising applying a voltage across the conductive core of the coated conductor of aspect 10 so as to generate a flow of electricity through the conductive core.

Moisture-curable formulation. The total weight of all constituents in the moisture-curable formulation is 100.00 wt %. The moisture-curable formulation may further comprise water.

The moisture-curable polyolefin composition may be a one-part formulation, alternatively a multi-part formulation such as a two-part formulation. The two-part formulation may comprise first and second parts, wherein the first part consists essentially of the (A) (hydrolyzable silyl group)-functional polyolefin prepolymer and the (B) ascorbyl carboxylate ester and the second part consists essentially of an additional portion of (A) and optionally any one or more of constituents (C) to (H).

The moisture-curable formulation may be in a continuous (monolithic) or divided solid form. The moisture-curable formulation may comprise granules and/or pellets. Prior to the mixing step used to prepare the moisture-curable formulation, the (A) (hydrolyzable silyl group)-functional polyolefin prepolymer also may be in a divided solid form (e.g., granules or pellets).

In some aspects the moisture-curable formulation is free of a carboxylic acid of formula R—$CO_2H$, or a salt thereof (e.g., an amine or metal salt).

Constituent (A) the (hydrolyzable silyl group)-functional polyolefin prepolymer ("(A) prepolymer"). The polyolefin portion of the (A) prepolymer may be polyethylene based, which means that the (A) prepolymer has a backbone formed by polymerization of ethylene. Alternatively, the (A) prepolymer may be poly(ethylene-co-($C_3$-$C_{40}$)alpha-olefin)-based, which means that the (A) prepolymer has a backbone formed by copolymerization of ethylene and at least one alpha-olefin.

The (A) prepolymer may be a reactor copolymer of ethylene and an alkenyl-functional hydrolyzable silane. The alkenyl-functional hydrolyzable silane may be of formula (III) $(R^2)_m(R^3)_{3-m}Si$—($C_2$-$C_6$)alkenyl (III), wherein m, $R^2$, and $R^3$ are as defined above for formula (II). The ($C_2$-$C_6$)alkenyl may be vinyl, allyl, 3-butenyl, or 5-hexenyl. In some aspects the (A) prepolymer is a reactor copolymer of ethylene and vinyltrimethoxysilane. Vinyltrimethoxysilane is an example of the alkenyl-functional hydrolyzable silane of formula (III) wherein subscript m is 3, each $R^2$ is a ($C_1$-$C_6$) alkoxy, specifically methoxy; and the ($C_2$-$C_6$)alkenyl is vinyl (—C(H)=$CH_2$).

Alternatively, the (A) prepolymer may be a reactor copolymer of ethylene, an alpha-olefin, and the alkenyl-functional hydrolyzable silane, such as in U.S. Pat. No. 6,936, 671.

Alternatively, the (A) prepolymer may be a homopolymer of ethylene having a carbon atom backbone having the hydrolyzable silyl groups grafted thereonto, such as a polymer made by a process (e.g., a SIOPLAS™ process) comprising reactively grafting a hydrolyzable unsaturated silane (e.g., vinyltrimethoxysilane) in a post-polymerization compounding or extruding step, typically facilitated by a free radical initiator such as a dialkyl peroxide, and isolating the resulting silane-grafted polymer. The grafted polymer may be for used in a subsequent fabricating step.

Alternatively, the (A) prepolymer may be a copolymer of ethylene and one or more of ($C_3$-$C_{40}$)alpha-olefins and unsaturated carboxylic esters (e.g., (meth)acrylate alkyl esters), wherein the copolymer has a backbone having the hydrolyzable silyl groups grafted thereonto, such as made by a SIOPLAS™ process.

Alternatively, the (A) prepolymer may be a mixture of ethylene, a hydrolyzable silane such as the alkenyl-functional hydrolyzable silane of formula (III), and a peroxide suitable for use in a process (e.g., a MONOSIL™ process) comprising reactively grafting a hydrolyzable unsaturated silane (e.g., vinyltrimethoxysilane) in a post-polymerization compounding or extruding step, typically facilitated by a free radical initiator such as a dialkyl peroxide, and using the resulting silane-grafted polymer immediately (without isolation) in a subsequent fabricating step.

Alternatively, the (A) prepolymer may be a mixture of a copolymer of ethylene and one or more of ($C_3$-$C_{40}$)alpha-olefins and unsaturated carboxylic esters, a hydrolyzable silane such as the alkenyl-functional hydrolyzable silane of formula (III), and a peroxide, suitable for use in a SIOPLAS™ or MONOSIL™ process. The alpha-olefin may be a ($C_3$-$C_{40}$)alpha-olefin, alternatively a ($C_3$-$C_{20}$)alpha-olefin, alternatively a ($C_3$-$C_{10}$)alpha-olefin. The alpha-olefin may have at least four carbon atoms (i.e., be a ($C_4$)alpha-olefin or larger). Examples of the ($C_3$-$C_{10}$)alpha-olefin are propylene, 1-butene, 1-hexene, 1-octene, and 1-decene. The peroxide may be an organic peroxide such as described in WO 2015/149634 A1, page 5, line 6, to page 6, line 2, or as described below for (C1) organic peroxide.

Alternatively, the (A) (hydrolyzable silyl group)-functional polyolefin prepolymer ("(A) prepolymer") may be: (i) a reactor copolymer of ethylene and a hydrolyzable silane; (ii) a reactor copolymer of ethylene, a hydrolyzable silane, and one or more alpha-olefins and unsaturated carboxylic esters (e.g., U.S. Pat. No. 6,936,671); (iii) a homopolymer of ethylene having a carbon backbone and a hydrolyzable silane grafted to the carbon backbone (e.g., made by the SILOPAS™ process); (iv) a copolymer of ethylene, one or more alpha-olefins and unsaturated carboxylic esters, having backbone and a hydrolyzable silane grafted to its backbone (e.g., made by the SILOPAS™ process); (v) a copolymer formed from a mixture of ethylene, hydrolyzable silane, and organic peroxide (e.g., made by the MONOSIL™ process); or (vi) a copolymer formed from a mixture of ethylene, and one or more alpha-olefins and unsaturated carboxylic esters, a hydrolyzable silane, and an organic peroxide (e.g., made by the MONOSIL™ process).

The (A) prepolymer is from 89.0 to 99.95 weight percent (wt %), alternatively 94.0 to 99.95 wt %, alternatively 97.0 to 99.90 wt % of the combined weight of (A), (B), and optionally (C).

The (A) prepolymer may be present in the moisture-curable formulation at a concentration from 40 to 99.9 wt %, alternatively at least 50 wt %, alternatively at least 60 wt %; and alternatively at most 99 wt %, alternatively at most 95 wt %, alternatively at most 80 wt %; all based on total weight of the moisture-curable formulation.

Constituent (B) ascorbyl carboxylate ester. The (B) is an ascorbyl carboxylate ester of formula (I):

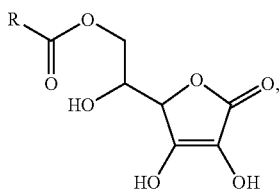

wherein R is an unsubstituted $(C_1-C_{45})$hydrocarbyl group.

The "unsubstituted" means R consists of carbon and hydrogen atoms. R may be a $(C_1-C_{45})$alkyl group, a $(C_2-C_{45})$alkenyl group, a $(C_6-C_{12})$aryl group, a $(C_1-C_{25})$alkyl-substituted $(C_6-C_{12})$aryl group, or a $(C_6-C_{12})$aryl-substituted $(C_1-C_{25})$alkyl group. In some aspects R is as defined above. In some aspects the (B) ascorbyl carboxylate ester of formula (I) is an ascorbyl palmitate or an ascorbyl stearate.

The ascorbyl portion of (B) is the monovalent structure of formula (1):

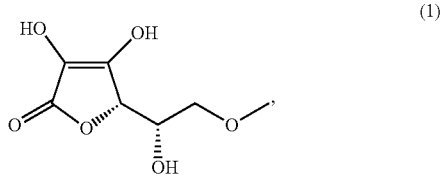

wherein the O— indicates a radical on rightmost O. In some aspects the ascorbyl portion of (B) is racemic. In other aspects the ascorbyl portion of (B) is stereochemically enriched in a particular stereoisomer. In some aspects the ascorbyl portion of (B) is derived from D-ascorbic acid. In some aspects the ascorbyl portion of (B) is derived from L-ascorbic acid. In some aspects the ascorbyl portion of (B) is derived from L-ascorbic acid and the R group in formula (I) is derived from palmitic acid such that (B) is the compound of formula (I-a):

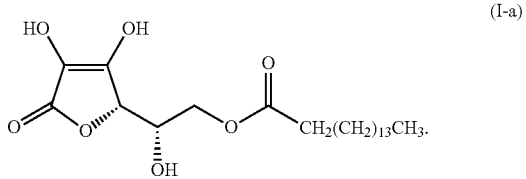

The compound of formula (I-a) is also known by any one of the following names: 6-O-palmitoyl-L-ascorbic acid, L-ascorbic acid 6-hexadecanoate, L-ascorbyl palmitate, and ascorbic acid 6-palmiate.

The (B) ascorbyl carboxylate ester of formula (I) may be characterized as being substantially pure before it is combined with the (A) prepolymer. The "substantially pure" (B) is characterized as being from 90 to 100 wt %, alternatively from 95 to 100 wt %, alternatively from 98 to 100 wt %, alternatively from 90, 95, or 98 to 99.99 wt % of the total weight of (B).

The (B) ascorbyl carboxylate ester of formula (I) may be synthesized by coupling the 6-hydroxyl group (i.e., HOCH$_2$—) of ascorbic acid with a carboxylic acid of formula RCO$_2$H, a carboxylic anhydride of formula RC(O)—O—C(O)R, or an acid chloride of formula RC(O)Cl using conventional esterification methods and conditions to give the compound of formula (I) and its corresponding carboxylic ester group (i.e., RC(O)—OCH$_2$—).

The (B) ascorbyl carboxylate ester of formula (I) is from 11.0 to 0.1 wt % of total weight (100.00 wt %) of the combined weight of (A), (B), and optionally (C).

The (B) ascorbyl carboxylate ester of formula (I) is from 11.0 to 0.05 wt %, alternatively 6.0 to 0.05 wt %, alternatively 3.0 to 0.10 wt % of total weight (100.00 wt %) of the total weight of the moisture-curable formulation.

Ascorbic acid per se is shown later to be inactive as a catalyst in a moisture-curable formulation with the (A) prepolymer, whereas the (B) ascorbyl carboxylate ester is active. Formally converting the 6-hydroxyl group in ascorbic acid per se into the carboxylic ester group unpredictably gives an active catalyst of the formula (I).

Without wishing to be bound by theory, it is believed that the choice of any particular R group in formula (I) of (B) does not have a completely neutralizing effect on the ability of (B) to catalyze moisture curing of the moisture-curable formulation. Rather, the choice of R is believed to primarily affect solubility of (B) in the (A) prepolymer, wherein the greater the number of carbon atoms in R, the greater is the expected solubility (maximum loading) of (B) in the (A) prepolymer. Said differently, by converting the 6-hydroxyl group in ascorbic acid per se into a carboxylic ester group (i.e., RC(O)—OCH$_2$—) in the compound of formula (I), the solubility of the resulting (B) in (A) is substantially enhanced versus the solubility of ascorbic acid per se in (A). Thus the loading of ascorbyl acetate (compound of formula (I) wherein R is methyl) in the (A) prepolymer is expected to be sufficient to achieve the technical solution.

The optional constituent (C) peroxide: a molecule containing carbon atoms, hydrogen atoms, and two or more oxygen atoms, and having at least one —O—O— group, with the proviso that when there are more than one —O—O— group, each —O—O— group is bonded indirectly to another —O—O— group via one or more carbon atoms, or collection of such molecules. The (C) peroxide may be added to the moisture-curable formulation for curing comprising heating the moisture-curable formulation comprising constituents (A), (B), and (C) to a temperature at or above the (C) peroxide's decomposition temperature.

The (C) peroxide may be the (C1) hydrocarbyl hydroperoxide. (C1) may be a compound of formula $R^O$—O—O—H, wherein $R^O$ independently is a $(C_1-C_{20})$alkyl group or $(C_6-C_{20})$aryl group. Each $(C_1-C_{20})$alkyl group independently is unsubstituted or substituted with 1 or 2 $(C_6-C_{12})$ aryl groups. Each $(C_6-C_{20})$aryl group is unsubstituted or substituted with 1 to 4 $(C_1-C_{10})$alkyl groups. The (C1) hydroperoxide may be 1,1-dimethylethyl hydroperoxide; 1,1-dimethylpropyl hydroperoxide; benzoyl hydroperoxide; tert-butyl hydroperoxide; tert-amyl hydroperoxide; or a cumyl hydroperoxide. The cumyl hydroperoxide may be isopropylcumyl hydroperoxide; t-butylcumyl hydroperoxide; or cumyl hydroperoxide; alternatively cumyl hydroperoxide (also known as cumene hydroperoxide, alpha,alpha-dimethylbenzyl hydroperoxide, CAS No. 80-15-9).

The (C) peroxide may be the (C2) organic peroxide. (C2) may be a monoperoxide of formula $R^O$—O—O—$R^O$, wherein each $R^O$ independently is as defined above. Alternatively, the (C2) may be a diperoxide of formula $R^O$—O—O—$R^a$—O—O—$R^O$, wherein $R^a$ is a divalent hydrocarbon group such as a $(C_2-C_{10})$alkylene, $(C_3-C_{10})$cycloalkylene, or phenylene, and each $R^O$ independently is as defined above. The (C2) organic peroxide may be bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropylcumyl) peroxide; or dicumyl peroxide. The (C2) organic peroxide may be dicumyl peroxide.

In some aspects only a blend of two or more (C) peroxides is used.

In some aspects at least one, alternatively each (C) peroxide contains one —O—O— group. In some aspects the moisture-curable formulation does not contain any (C) peroxide. In other aspects the moisture-curable formulation contains the (C) peroxide at a concentration of from 0.01 to 4.5 wt %, alternatively 0.05 to 2 wt %, alternatively 0.10 to 2.0 wt %, alternatively 0.2 to 0.8 wt % of the moisture-curable formulation. When present in the moisture curable formulation, the (C) peroxide is from 0.01 to 1.0 wt %, alternatively 0.05 to 0.5 wt %, alternatively 0.08 to 0.20 wt % of total weight (100.00 wt %) of the combined weight of (A), (B), and (C).

When optional constituent (C) peroxide is used to prepare the moisture-curable formulation, the moisture-curable formulation may comprise the (C) peroxide and/or the ($B^{Ox}$) reaction product of (C) peroxide-oxidation of the (B) ascorbyl carboxylate ester. The ($B^{Ox}$) reaction product of (C) peroxide-oxidation of the (B) ascorbyl carboxylate ester may be formed in situ from a precursor form of the moisture-curable formulation comprising (A), (B), and (C). Without wishing to be bound by theory, it is believed that the ($B^{Ox}$) reaction product is a more effective catalyst for catalyzing the moisture curing of the moisture-curable formulation than is the (B) ascorbyl carboxylate ester per se. That is, when a first embodiment of the moisture-curable formulation comprising (A) and (B), but lacking (C), is divided into equal weight parts, and the first weight part (lacking (C)) is subjected to moisture curing conditions as is, and the second weight part is further combined with an amount of (C) (e.g., such as by soaking (C) into the second weight part at 60° C. for 16 hours) to give a second embodiment of the moisture curable formulation comprising (A), (B), and (C), and the second embodiment is subjected to the same moisture curing conditions, the second embodiment of the moisture-curable formulation is expected to cure at a faster rate than that of the first weight part of the first embodiment of the moisture-curable formulation.

Optional constituent (additive) (D) flame retardant. The (D) flame retardant is a compound that inhibits or delays the spread of fire by suppressing chemical reactions in a flame. In some aspects (D) flame retardant is (D1) a mineral, (D2) an organohalogen compound, (D3) an (organo)phosphorous compound; (D4) a halogenated silicone; or (D5) a combination of any two or more of (D1) to (D4). Typically, the halogenated (D) flame retardants are used in conjunction with a synergist to enhance their efficiency. The synergist may be antimony trioxide. Examples of the halogen-free (D) flame retardants are inorganic minerals, organic nitrogen intumescent compounds, and phosphorus based intumescent compounds. Examples of the inorganic minerals are aluminum hydroxide and magnesium hydroxide. Examples of the phosphorous-based intumescent compounds are organic phosphonic acids, phosphonates, phosphinates, phosphonites, phosphinites, phosphine oxides, phosphines, phosphites, phosphates, phosphonitrilic chloride, phosphorus ester amides, phosphoric acid amides, phosphonic acid amides, phosphinic acid amides, melamine and melamine derivatives thereof, including melamine polyphosphate, melamine pyrophosphate and melamine cyanurate, and mixtures of two or more of these materials. Examples include phenyl-bisdodecyl phosphate, phenylbisneopentyl phosphate, phenyl ethylene hydrogen phosphate, phenyl-bis-3,5,5' trimethylhexyl phosphate), ethyldiphenyl phosphate, 2 ethylhexyl di(p-tolyl) phosphate, diphenyl hydrogen phosphate, bis(2-ethyl-hexyl) para-tolylphosphate, tritolyl phosphate, bis(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, and diphenyl hydrogen phosphate. Phosphoric acid esters of the type described in U.S. Pat. No. 6,404,971 are examples of phosphorus-based flame retardants. Additional examples include liquid phosphates such as bisphenol A diphosphate (BAPP) (Adeka Palmarole) and/or resorcinol bis(diphenyl phosphate) (Fyroflex RDP) (Supresta, ICI), solid phosphorus such as ammonium polyphosphate (APP), piperazine pyrophosphate and piperazine polyphosphate. Ammonium polyphosphate is often used with flame retardant co-additives, such as melamine derivatives. Also useful is Melafine (DSM) (2,4,6-triamino-1,3,5-triazine; fine grind melamine). In some aspects (D) is not present in the inventive formulation and/or product. In some aspects (D) is present in the inventive formulation and/or product at a concentration from 0.1 to 20 wt %, alternatively 1 to 10 wt %; and alternatively 5 to 20 wt %; all based on total weight thereof.

Optional constituent (additive) (E) an antioxidant: an organic molecule that inhibits oxidation, or a collection of such molecules. The (E) antioxidant functions to provide antioxidizing properties to the moisture-curable formulation and/or crosslinked polyolefin product. Examples of suitable (E) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4; 4,4'-thiobis(2-t-butyl-5-methylphenol) (also known as 4,4'-thiobis(6-tert-butyl-m-cresol), CAS No. 96-69-5, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); distearyl thiodipropionate ("DSTDP"); dilauryl thiodipropionate (e.g., IRGANOX PS 800); stearyl 3-(3,5-di-t-butyl-4-hydroxyphenyl)propionate (e.g., IRGANOX 1076); 2,4-bis(dodecylthiomethyl)-6-methylphenol (IRGANOX 1726); 4,6-bis(octylthiomethyl)-o-cresol (e.g. IRGANOX 1520); and 2',3-bis[[3-[3,5-di-tert-butyl-4-hydroxyphenyl]propionyl]] propionohydrazide (IRGANOX 1024). In some aspects (E) is 4,4'-thiobis(2-t-butyl-5-methylphenol) (also known as 4,4'-thiobis(6-tert-butyl-m-cresol);

2,2'-thiobis(6-t-butyl-4-methylphenol); tris[(4-tert-butyl-3-hydroxy-2,6-dimethylphenyl)methyl]-1,3,5-triazine-2,4,6-trione; distearyl thiodipropionate; or dilauryl thiodipropionate; or a combination of any two or more thereof. The combination may be tris[(4-tert-butyl-3-hydroxy-2,6-dimethylphenyl)methyl]-1,3,5-triazine-2,4,6-trione and distearyl thiodipropionate. In some aspects the moisture-curable formulation and/or crosslinked polyolefin product is free of (E). When present, the (E) antioxidant may be from 0.01 to 1.5 wt %, alternatively 0.05 to 1.2 wt %, alternatively 0.1 to 1.0 wt % of the total weight of the moisture-curable formulation and/or crosslinked polyolefin product.

Optional constituent (additive) (F) a metal deactivator. The (F) metal deactivator functions to chelate with transition metal ions (e.g., residues of olefin polymerization catalysts) to render them inactive as oxidation catalysts. Examples of (F) are N'1,N'12-bis(2-hydroxybenzoyl)dodecanedihydrazide (CAS no. 63245-38-5), and oxalyl bis(benzylidene hydrazide) (OABH). In some aspects (F) is not present in the inventive formulation and/or product. In some aspects (F) is present in the inventive formulation and/or product at a concentration from 0.001 to 0.2 wt %, alternatively 0.01 to 0.15 wt %, alternatively 0.01 to 0.10 wt %, all based on total weight thereof.

Optional constituent (additive) (G) a colorant. E.g., a pigment or dye. E.g., carbon black or titanium dioxide. The carbon black may be provided as a carbon black masterbatch that is a formulation of poly(1-butene-co-ethylene) copolymer (from 95 wt % to <100 wt % of the total weight of the masterbatch) and carbon black (from >0 wt % to 5 wt % of the total weight of the masterbatch. Carbon black is a finely-divided form of paracrystalline carbon having a high surface area-to-volume ratio, but lower than that of activated carbon. Examples of carbon black are furnace carbon black, acetylene carbon black, conductive carbons (e.g., carbon fibers, carbon nanotubes, graphene, graphites, and expanded graphite platelets). In some aspects (G) is not present in the inventive formulation and/or product. In some aspects (G) is present in the inventive formulation and/or product at a concentration from 0.1 to 35 wt %, alternatively 1 to 10 wt %, based on total weight thereof.

Optional constituent (additive) (H) moisture scavenger. The (H) moisture scavenger functions to inhibit premature moisture curing of the moisture-curable formulation, wherein premature moisture curing would result from premature or prolonged exposure of the moisture-curable formulation to ambient air. Examples of (H) are octyltriethoxysilane and octyltrimethoxysilane. In some aspects (H) is not present in the inventive formulation and/or product. In some aspects (H) is present in the inventive formulation and/or product at a concentration from 0.001 to 0.2 wt %, alternatively 0.01 to 0.15 wt %, alternatively 0.01 to 0.10 wt %, all based on total weight thereof.

Other optional constituents. In some aspects the inventive formulation and product does not contain any optional constituents. In some aspects the inventive formulation and product does not contain any optional constituents other than constituents (C) to (H). In some aspects the inventive formulation and/or product further contains at least one optional constituent (additive) that is a lubricant, mineral oil, an anti-blocking agent, a treeing retardant (water treeing and/or electrical treeing retardant), a coagent, a nucleating agent, a scorch retardant, a hindered amine light stabilizer, and a processing aid.

Any optional constituent may be useful for imparting at least one characteristic or property to the inventive formulation and/or product in need thereof. The characteristic or property may be useful for improving performance of the inventive formulation and/or product in operations or applications wherein the inventive formulation and/or product is exposed to elevated operating temperature. Such operations or applications include melt mixing, extrusion, molding, hot water pipe, and insulation layer of an electrical power cable.

Any compound herein includes all its isotopic forms, including natural abundance forms and/or isotopically-enriched forms. The isotopically-enriched forms may have additional uses, such as medical or anti-counterfeiting applications.

The following apply unless indicated otherwise. Alternatively precedes a distinct embodiment. ASTM means the standards organization, ASTM International, West Conshohocken, Pennsylvania, USA. IEC means the standards organization, International Electrotechnical Commission, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). PPM are weight based. Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature is 23° C.±1° C. Substituted when referring to a compound means having, in place of hydrogen, one or more substituents, up to and including per substitution.

EXAMPLES (Hydrolyzable silyl group)-functional prepolymer (A1): a reactor copolymer of 98.5 wt % ethylene and 1.5 wt % vinyltrimethoxysilane. Prepared by copolymerizing ethylene and vinyltrimethoxysilane in a tubular high pressure polyethylene reactor with a free radical initiator. Available as SI-LINK™ DFDA-5451 from The Dow Chemical Company.

(Hydrolyzable silyl group)-functional polyolefin prepolymer (A2): 99.5 wt % (Hydrolyzable silyl group)-functional prepolymer (A1) plus 0.5 wt % Moisture scavenger (H1) (below). Made by soaking the Moisture scavenger (H1) into the (Hydrolyzable silyl group)-functional prepolymer (A1).

Ascorbyl carboxylate ester (B1): ascorbyl palmitate. Available from Sigma-Aldrich Corporation, St. Louis, Missouri, USA Constituent (C1-1): cumyl hydroperoxide. Available as cumene hydroperoxide from Sigma-Aldrich Corporation.

Ascorbic acid ("AscrbA"): Available from Sigma-Aldrich Corporation.

Methyl palmitate ("MePalm"): compound of formula $CH_3(CH_2)_{14}C(O)OCH_3$. Available from Sigma-Aldrich Corporation.

Moisture-curable formulation Sample Preparation Method: all of the constituents used in any one of the formulations of Comparative Examples CE1 to CE8 and Inventive Examples IE1 to IE10 described later in Tables 1 and 2, except the constituent (C1-1) if any, were mixed in a batch mixer at 145° C. (a target temperature that is about 20° C. higher than the melting point of prepolymer (A1)) for 5 minutes at 40 rotations per minute (rpm) to give moisture-curable formulation containing constituents (A1) and (B1)

and any other constituents indicated in Tables 1 and 2 except being free of constituent (C1-1). After mixing, the sample was extruded to single strand at a temperature profile from 125° to 140° C., and the strand was pelletized in air to give the comparative formulation or the inventive moisture-curable formulation, as the case may be, in the form of pellets. Constituent (C1-1), where used, was soaked into the pellets at 60° C. overnight to give moisture-curable formulation containing constituents (A), (B), and (C), and optionally any optional constituents indicated in Table 2.

Plaque Preparation Test Method: The soaked pellets made by the Moisture-curable formulation Sample Preparation Method were compressed into a plaque through a double compression procedure. The first compression was conducted at 120° C. for 3 minutes under 3.45 megapascals (MPa, 500 psi), plus 3 minutes under 172 MPa (25,000 psi). In the second step, the plaque was cut into quarters and re-compressed at 120° C. for 3 minutes at 3.45 MPa (500 psi), plus 15 minutes at 180° to 185° C., or at 210° to 215° C., both under 172 MPa (25,000 psi) to give a second plaque with thickness of 1.27 millimeters (mm, 50 mils).

Hot Creep Test Method. Measures extent of crosslinking, and thus extent of curing, in the test sample of the moisture-curable formulation prepared by the below Moisture Curing Test Method. Hot creep measurement was performed at 20 Newtons per square centimeter (N/cm$^2$) and 150° C., according to ICEA T-28-562. After 15 minutes, the final length under load was measured. Cool and measure the length of the tested sample. The amount of extension divided by initial length provides a measure of hot creep as a percentage. Express the extent of elongation of the test sample as a percentage (%) of the length of the tested sample after hot creep conditions relative to the initial length of test sample prior to hot creep conditions. The lower the hot creep percent, the lower the extent of elongation of a test sample under load, and thus the greater the extent of crosslinking, and thus the greater the extent of curing. A lower hot creep value suggests a higher crosslink degree.

Moisture Curing Test Method. Moisture curing and Curing rate measurement Test Method. The second plaque was cured by immersing it in a water bath at 90° C. for 66 hours, and the $M_L$ (low torque value) at 182° C. was measured via moving die rheometer (MDR). Measure torque of a test sample using the following procedure. Heat test sample in a moving die rheometer (MDR) instrument MDR2000 (Alpha Technologies) at 180° C. for 20 minutes while monitoring change in torque for oscillatory deformation of 0.5 degree arc at 100 cpm. Designate the lowest measured torque value as "$M_L$", expressed in deciNewton-meter (dN-m). As curing or crosslinking progresses, the measured torque value increases, eventually reaching a maximum torque value. Designate the maximum or highest measured torque value as "$M_H$", expressed in dN-m. All other things being equal, the greater the $M_H$ torque value, the greater the extent of crosslinking. All other things being equal, the sooner the torque value $M_L$ reaches 1 pound-inch (1.1 dN-m), the faster the curing rate of the test sample. Conversely, the longer the torque value $M_L$ needs to reach 1 pound-inch (1.1 dN-m), the slower the curing rate of the test sample. $M_L$ indicates the rheology change in curing process, the higher value suggests higher degree of crosslinking. The curing time needed to reach $M_L$=1.0 lbf·in (1.1 deciNewton-meter) was recorded.

Comparative Examples 1 to 8 (CE1 to CE8): comparative formulations were prepared and tested according to the above described methods. See results described in Table 1 later.

Inventive Examples 1 to 10 (IE1 to IE10): inventive moisture-curable formulations were prepared and tested according to the above described methods. See results described in Table 2 later.

TABLE 1

| Compositions (wt %) and properties: CE1 to CE8. | | | | | | | | |
|---|---|---|---|---|---|---|---|---|
| Ex. No. | CE1 | CE2 | CE3 | CE4 | CE5 | CE6 | CE7 | CE8 |
| Prepolymer (A2) | 99.9 | 100 | 99.85 | 99.75 | 99.40 | 99.30 | 99.85 | 99.75 |
| Ascorb. Cat. (B1) | 0 | 0 | 0 | 0 | 0 | 0 | 0 | 0 |
| Peroxide (C1-1) | 0.10 | 0 | 0 | 0.10 | 0 | 0.10 | 0 | 0.10 |
| AscrbA | 0 | 0 | 0.15 | 0.15 | 0.60 | 0.60 | 0 | 0 |
| MePalm | 0 | 0 | 0 | 0 | 0 | 0 | 0.15 | 0.15 |
| Total | 100 | 100 | 100 | 100 | 100 | 100 | 100 | 100 |
| Hot Creep (%), after curing at 90° C. for 6 hours | N/m* | N/m | N/m | N/m | Fail** | Fail | Fail | Fail |
| Time to reach $M_L$ = 1.1 dN-m (hours) | Not^ | Not | Not | Not | >96 | >96 | Not | Not |
| Final Compression Temp. (° C.) | 180 to 185 | 180 to 185 | 180 to 185 | 180 to 185 | 180 to 185 | 180 to 185 | 180 to 185 | 180 to 185 |

*N/m means not measured.
**Fail: sample broke.
^Not: unable to reach $M_L$ = 1.1 dN-m within 66 hours.

TABLE 2

Compositions (wt %) and properties: IE1 to IE10.

| Ex. No. | IE1 | IE2 | IE3 | IE4 | IE5 | IE6 | IE7 | IE8 | IE9 | IE10 |
|---|---|---|---|---|---|---|---|---|---|---|
| Prepolymer (A2) | 99.85 | 99.75 | 99.70 | 99.60 | 99.40 | 99.30 | 99.00 | 98.90 | 98.85 | 98.80 |
| Ascorb. Cat. (B1) | 0.15 | 0.15 | 0.30 | 0.30 | 0.60 | 0.60 | 1.00 | 1.00 | 1.00 | 1.00 |
| Hydro-peroxide (C1-1) | 0 | 0.10 | 0 | 0.10 | 0 | 0.10 | 0 | 0.10 | 0.15 | 0.20 |
| AscrbA | 0 | 0 | 0 | 0 | 0 | 0 | 0 | 0 | 0 | 0 |
| MePalm | 0 | 0 | 0 | 0 | 0 | 0 | 0 | 0 | 0 | 0 |
| Total | 100 | 100 | 100 | 100 | 100 | 100 | 100 | 100 | 100 | 100 |
| Hot Creep (%), after curing at 90° C. for 6 hours | Fail* | 46.3 | 74.5 | 38.9 | 35.5 | 29.8 | N/m** | N/m | N/m | N/m |
| Hot Creep (%), after curing at 90° C. for 25 hours | N/m | N/m | N/m | N/m | N/m | N/m | 58.3 | 35.0 | 36.2 | 36.5 |
| Time to reach $M_L = 1.1$ dN-m (hours) | 64 | 40 | 30 | <20 | <15 | <15 | 5 | <4 | <4 | <4 |
| Final Compression Temp. (° C.) | 180 to 185 | 180 to 185 | 180 to 185 | 180 to 185 | 180 to 185 | 180 to 185 | 180 to 185 | 180 to 185 | 180 to 185 | 180 to 185 |

*Fail means broke.
**N/m means not measured.

The time to reach torque value $M_L$=1.1 dN-m in Tables 1 and 2 show that the curing rates using ascorbic acid as catalyst in the comparative formulations are unacceptably slow. The curing rates using ascorbyl palmitate in the inventive moisture-curable formulations are substantially faster.

The hot creep data in Tables 1 and 2 show that inventive examples IE2 to IE10 all passed the Hot Creep test, with one inventive example IE1 that did not pass, whereas none of comparative examples CE1 to CE8 passed the hot creep test. This indicates the inventive moisture-curable formulations may be cured to the moisture-cured polyolefin products that beneficially have a greater extent of crosslinking than that of the comparative formulations. The lower the Hot Creep %, the greater the extent of crosslinking, and the greater the extent of crosslinking, the more suitable the moisture-cured polyolefin product is for use as a coating layer on a power cable.

The invention claimed is:

1. A moisture-curable formulation comprising:
   (A) a (hydrolyzable silyl group)-functional polyolefin prepolymer; and
   (B) an ascorbyl carboxylate ester of formula (I):

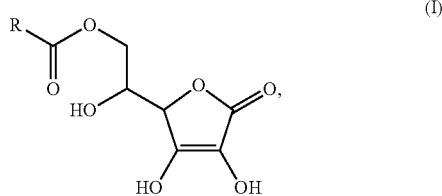

(I)

wherein (A) is from 89.0 to 99.4 weight percent (wt %) and (B) is from 11.0 to 0.6 wt % of the combined weight of (A) and (B); wherein (A) is from 40 to 99.9 wt % of total weight of the moisture-curable formulation and (B) is from 0.1 to 11 wt % of the total weight of the moisture-curable formulation; and further wherein the (B) ascorbyl carboxylate ester of formula (I) is characterized by any one of limitations (i) to (ii): (i) R is an unsubstituted ($C_2$-$C_{45}$) alkenyl group, and (ii) R is an unsubstituted ($C_6$-$C_{12}$) aryl group.

2. The moisture-curable formulation of claim 1 wherein the (A) (hydrolyzable silyl group)-functional polyolefin prepolymer is characterized by any one of limitations (i) to (iii): (i) each hydrolyzable silyl group is independently a monovalent group of formula (II): $(R^2)_m(R^3)_{3-m}Si$— (II); wherein subscript m is an integer of 1, 2, or 3; each $R^2$ is independently H, HO—, ($C_1$-$C_6$)alkoxy, ($C_2$-$C_6$)carboxy, (($C_1$-$C_6$)alkyl)$_2$N—, ($C_1$-$C_6$)alkyl(H)C=NO—, or (($C_1$-$C_6$)alkyl)$_2$C=NO—; and each $R^3$ is independently ($C_1$-$C_6$) alkyl or phenyl; (ii) the polyolefin portion of (A) is polyethylene based, poly(ethylene-co-($C_3$-$C_{40}$)alpha-olefin)-based, or a combination thereof; and (iii) both (i) and (ii).

3. The moisture-curable formulation of claim 1 further comprising (C) a peroxide and/or ($B^{Ox}$) a reaction product of oxidation of the (B) ascorbyl carboxylate ester by the (C) peroxide; wherein the (C) peroxide is (C1) a hydrocarbyl hydroperoxide or (C2) an organic peroxide.

4. The moisture-curable formulation of claim 1 further comprising at least one additive selected from additives (D) to (I): (D) a flame retardant; (E) an antioxidant; (F) a metal deactivator; (G) a colorant; (H) a moisture scavenger; and (I) a combination of any two or more of (D) to (H).

5. A method of making a moisture-curable formulation, the method comprising mixing (A) a (hydrolyzable silyl group)-functional polyolefin prepolymer and (B) an ascorbyl carboxylate ester of formula (I)

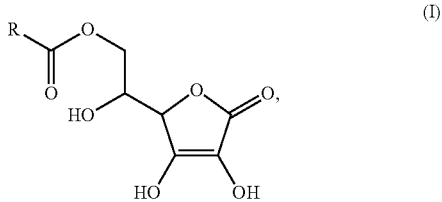

so as to give a mixture wherein (A) is from 89.0 to 99.4 weight percent (wt %) and (B) is from 11.0 to 0.6 wt % of the combined weight of (A) and (B); and melting or extruding the mixture so as to make the moisture-curable formulation; and further wherein the (B) ascorbyl carboxylate ester of formula (I) is characterized by any one of limitations (i) to (ii): (i) R is an unsubstituted ($C_2$-$C_{45}$) alkenyl group; and (ii) R is an unsubstituted ($C_6$-$C_{12}$) aryl group.

6. A moisture-cured polyolefin product that is a product of moisture curing the moisture-curable formulation of claim 1 to give the moisture-cured polyolefin product.

7. A manufactured article comprising a shaped form of the moisture-cured polyolefin product of claim 6.

8. A coated conductor comprising a conductive core and a polymeric layer at least partially surrounding the conductive core, wherein at least a portion of the polymeric layer comprises the moisture-cured polyolefin product of claim 6.

9. A method of conducting electricity, the method comprising applying a voltage across the conductive core of the coated conductor of claim 8 so as to generate a flow of electricity through the conductive core.

* * * * *